United States Patent Office 3,447,950
Patented June 3, 1969

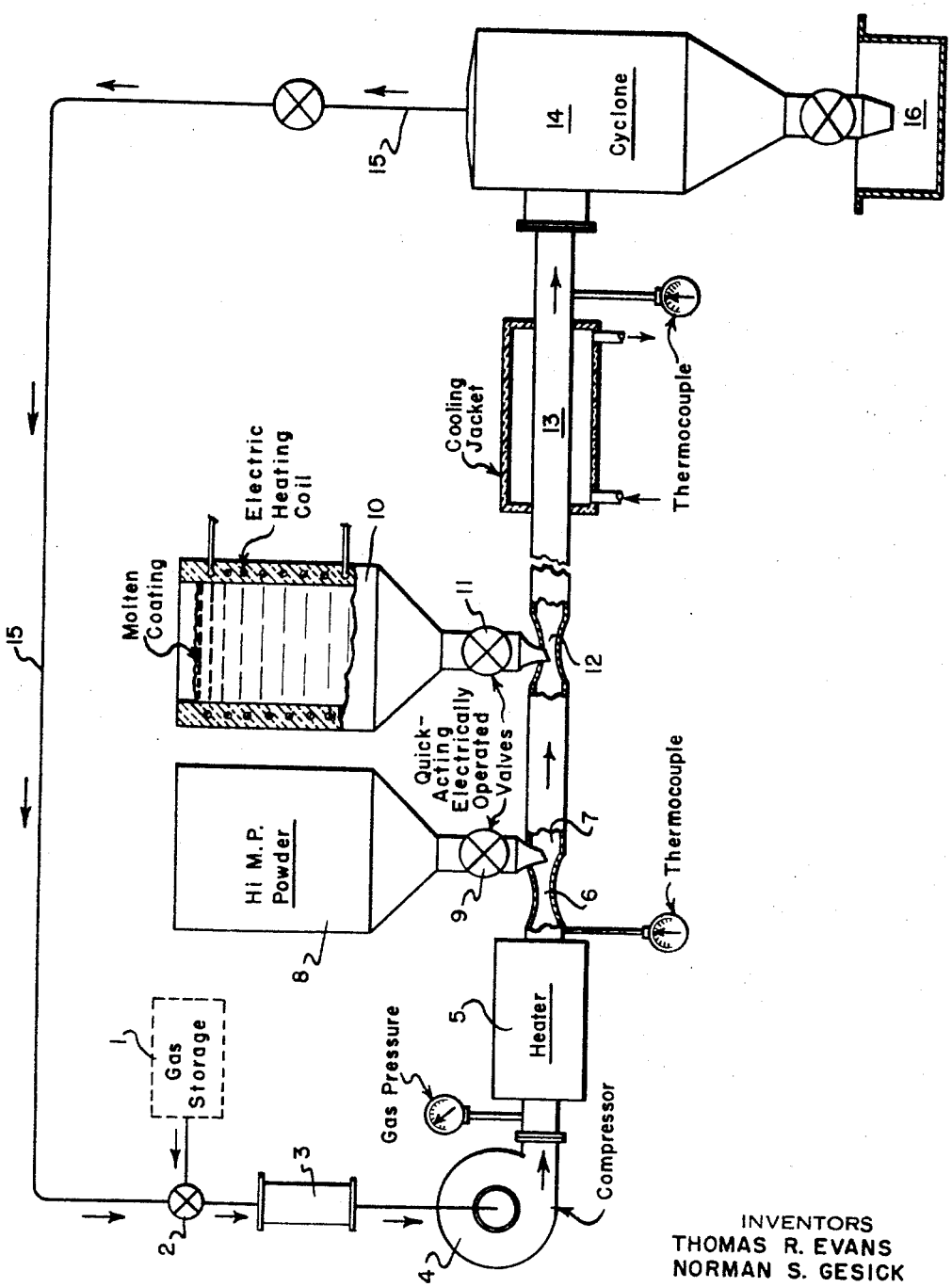

3,447,950
PRODUCTION OF ENCAPSULATED POWDERS
Thomas R. Evans, Sayport, and Norman S. Gesick, Killingworth, Conn., assignors to Valley Metallurgical Processing Company, Incorporated, a corporation of Connecticut
Filed Feb. 3, 1966, Ser. No. 524,954
Int. Cl. B44d 1/20
U.S. Cl. 117—100    11 Claims

ABSTRACT OF THE DISCLOSURE

Solid powders having a melting point $T_1$ are encapsulated with a coating of a normally solid coating material having a melting point $T_2$, where $T_2 < T_1$, by (a) fluidizing the solid powder in the stream of a carrier gas to form a fluidized bed of the solid powder in the carrier gas, (b) liquifying the coating material by heating it to a temperature greater than $T_2$ and then introducing a predetermined amount of the liquified coating material in the fluidized bed under turbulent mixing conditions so that the coating material forms an aerosol within the carrier gas and thereby encapsulates subtsantially all of the solid powder which is suspended in the fluidized bed with a predetermined amount of the coating material, (c) passing the resultant fluidized bed through a cooling zone to cool the encapsulated powder to a temperature below $T_2$, thereby substantially solidifying the encapsulating coating material, and (d) recovering the encapsultaed powder. This technique is particularly useful for solid propellants and for various powder metallurgical applications.

---

This invention relates to the production of coated powders and, more particularly, to a process for the encapsulation of both metallic and non-metallic solid powders within any noramlly solid, lower metling coating material. The invention provides an improved process for the production of encapsulated powders which are particularly useful for solid propellants and for various powder metallurgical applications.

Vapor deposition of a metal onto a substrate provides the only practical technique for the encapsulation (or coating) of solid powders with a sheath of metal, the technique being based on rapidly condensing a metal vapor around individual particles of powder. In general, two such methods are utilized commercially, the first being based on passing the powder through a vacuum chamber into which metal vapor had previously been introduced, while the second method is based on pyrolytically decomposing a metal salt to vaporize the metal in the presence of the powder being coated. Both methods require the vaporization of metal and, consequently, inherently utilize relatively large amounts of heat to coat or encapsulate relatively small quantities of powder.

Using fluid bed technology, in which solid powders are fluidized in a carrier gas, we have found that by fluidizing a solid powder having a melting point $T_1$ in a carrier gas it is possible under certain conditions to form in situ an aerosol of a normally solid coating material having a melting point $T_2$ (where T is less than $T_1$) within the fluidized bed and thereby encapsulate substantially all of the solid powder with a predetermined amount of the coating material. The invention provides an improved process for the production of encapsulated powders, by which a solid powder having a melting point $T_1$ is encapsulated within a coating of a normaly solid coating material having a melting point, where $T_2$ is less than $T_1$, which comprises (a) fluidizing the solid powder in a stream of a carrier gas (preferably but not necessarily at a temperature less than $T_1$ but greater than $T_2$) to form a fluidized bed of the solid powder in the carrier gas, (b) liquifying the coating material by heating it to a temperature greater than $T_2$ and then introducing a predetermined amount of the liquified coating material in the fluidized bed under turbulent mixing conditions so that the coating material forms an aerosol within the carrier gas and thereby encapsulates substantially all of the solid powder with a predetermined amount of the coating material, (c) passing the resultant fluidized bed through a cooling zone to cool the encapsulated powder to a temperature below $T_2$, thereby substantially solidifying the encapsulating coating material, and (d) recovering the encapsulated powder. The process of the invention is particularly suitable for the encapsulation of a wide variety of metallic and non-metallic solid powders with virtually any normally solid coating material (including both metals and non-metals) having a lower melting point than the particular solid powder being encapsulated.

The invention may be more readily comprehended by reference to the accompanying drawing, the single figure of which represents a schematic generalized flow sheet of the process of the invention which is applicable to the encapsulation of any metallic or non-metallic solid powder.

Referring to the generalized flow sheet, the carrier gas (including make-up carrier gas which is stored in a gas storage tank 1) is metered through a valve system 2 into a dust filter 3 from which the relatively dustless carrier gas is propelled by a compressor 4 through a heater 5 where the carrier gas is preheated to a temperature below that of $T_1$ (the melting point of the solid powder to be encapsulated) but above that of $T_2$ (the melting point of the coated material which is to be applied to the solid powder) before being introduced through a Venturi throat 6 into a horizontally-mounted fluid bed reactor 7.

Solid metallic or non-metallic powder having a melting point $T_1$, which is stored for convenience in a bin 8, is dropped from its storage bin through a quick-acting, electrically-operated valve 9 at a predetermined rate into the fluid bed reactor 7 where the solid powder is fluidized in the preheated carrier gas. Downstream of the point at which the solid powder becomes fluidized is an insulated, electrically-heated tank 10 in which the particular coating material to be used (which coating material is characterized by a melting point $T_2$, where $T_2$ is less than $T_1$) is melted or liquified at a temperature greater than $T_2$ and maintained in this molten or liquified state.

The molten or liquified (the terms being used interchangeably) coating material is metered through a second quick-acting, electrically-operated valve 11 and introduced at a predetermined rate into the fluid bed reactor 7 at a point at which the reactor is constricted to a second Venturi throat 12, thereby introducing the molten or liquified coating material into the fluidized bed under turbulent mixing conditions so that the coating material forms an aerosol within the carrier gas and encapsulates substantially all of the solid powder with a predetermined amount of coating material.

After encapsulation of the solid powder particles in the fluidized bed with the coating material, the resultant fluidized bed is passed through a cooling zone 13 where the encapsulated powder in the fluidized bed is cooled to a temperature below $T_2$, thereby substantially solidifying the encapsulating coating material. From the cooling zone 13, the fluidized bed is passed through a cyclone 14 in which the encapsulated powder is separated from the carrier gas which is recycled through a system 15 for reuse in the process. The encapsulated powder is recovered from the cyclone 14 and collected in a storage bin 16 from which it is sent to packaging.

Although the foregoing generalized description of the process of the invention shows the use of recirculation of the carrier gas (which is important when helium or other expensive gases are employed), the process may also be operated without recirculation of the carrier gas.

Selection of a suitable carrier gas for use in the encapsulation process of the invention may be made from any gas, including air, carbon dioxide, helium, argon, nitrogen, hydrogen, cracked ammonia (which is a mixture of nitrogen and hydrogen), depending upon whether oxidizing, reducing, neutral or inert conditions are required.

Nor is there any limitation on the type of solid powders which may be encapsulated or the type of normally solid coating material which may be applied, the sole criteria being that the melting point ($T_1$) of the particular solid powder be greater than the melting point ($T_2$) of the encapsulating coating material. Among the solid powders which have been encapsulated by the process of the invention are aluminum, copper, iron, and nickel, as well as a large number of non-metallic solid powders. Encapsulating material used successfully incude tin, zinc, aluminum, magnesium, and various normally solid lubricants (such as wax). Table I summarized the various solid powders which have been encapsulated by various coating materials in accordance iwth the process of the invention.

TABLE I

| Coating material: | Solid powders |
|---|---|
| Sn | Al, Cu, Fe, non-metallics. |
| Zn | Do |
| Al | Fe, Ni, Cu, non-metallics. |
| Mg | Do |
| Wax | Al, Cu, Fe, Ni, non-metallics. |

Using the process of the invention, we have been able to encapsulate solid metal powders with predetermined amounts from 0.1 to 50 percent by weight of a particular coating material per pass, at rates varying from 0.1 to several hundred pounds per minute. As used herein, the term "solid metal powders" includes both the pure metal as well as any of its various alloys.

The following examples are illustrative of the ease with which solid powders may be encapsulated with lower-melting coating materials in accordance with the process of the invention. In each of these examples, a particular metal powder was encapsulated in a coating material using the technique previously described.

Example I

Iron powder was coated with tin in three separate runs, using air as a carrier gas. The reaction conditions are summarized below in the following table:

ENCAPSULATION OF IRON POWDER WITH TIN

| Conditions | Example | | |
|---|---|---|---|
| | 1-A | 1-B | 1-C |
| Air temperature (° F.) | 460 | 460 | 460 |
| Temp. molten tin (° F.) | 455 | 455 | 455 |
| Cyclone gas temp. (° F.) | 430 | 430 | 430 |
| Iron powder rate (lb./min.) | 100 | 50 | 50 |
| Molten tin rate (lb./min.) | 5 | 5 | 10 |
| Percentage by wt., coating (percent) | 5 | 10 | 20 |

Example II

Copper powder was coated iwth zinc in three separate runs, using air as the carrier gas. The following table summarizes the reaction conditions employed.

ENCAPSULATION OF COPPER POWDER WITH ZINC

| Conditions | Example | | |
|---|---|---|---|
| | 2-A | 2-B | 2-C |
| Air temperature (° F.) | 815 | 815 | 815 |
| Temp. molten zinc (° F.) | 800 | 800 | 800 |
| Cyclone gas temp. (° F.) | 770 | 770 | 770 |
| Copper powder rate (lb./min.) | 100 | 50 | 50 |
| Molten zinc rate (lb./min.) | 5 | 5 | 10 |
| Percentage by wt., coating (percent) | 5 | 10 | 20 |

Example III

Copper powder was encapsulated with tin in three separate runs, using nitrogen as the carrier gas. The reaction conditions are summarized in the following table:

ENCAPSULATION OF COPPER POWDER WITH TIN

| Conditions | Example | | |
|---|---|---|---|
| | 3-A | 3-B | 3-C |
| Gas temperature (° F.) | 460 | 460 | 460 |
| Temp. molten tin (° F.) | 455 | 455 | 455 |
| Cyclone gas temp. (° F.) | 430 | 430 | 430 |
| Copper powder rate (lb./min.) | 10.1 | 5.0 | 5.0 |
| Molten tin rate, (lb./min.) | 0.5 | 0.5 | 1.0 |
| Percentage by wt., coating (percent) | 5 | 10 | 20 |

Example IV

Nickel powder was coated with aluminum in three separate runs, using air as the carrier gas. The reaction conditions are summarized below in the following table:

ENCAPSULATION OF NICKEL POWDER WITH ALUMINUM

| Conditions | Example | | |
|---|---|---|---|
| | 4-A | 4-B | 4-C |
| Gas temperature (° F.) | 1250 | 1250 | 1250 |
| Temp. molten aluminum (° F.) | 1230 | 1230 | 1230 |
| Cyclone gas temp. (° F.) | 1170 | 1170 | 1170 |
| Nickel powder rate, (lb./min.) | 100 | 50 | 50 |
| Molten aluminum rate (lb./min.) | 5 | 5 | 10 |
| Percentage by wt., coating (percent) | 5 | 10 | 20 |

Each of the encapsulated metal powders described in the foregoing examples was particularly suitable for use in powder metallurgical techniques where the corresponding uncoated metal powder has previously been used.

We claim:
1. A process for the production of encapsulated powders, by which a solid powder having a melting point $T_1$ is encapsulated with a coating of a normally solid coating material having a melting point $T_2$ where $T_2$ is less than $T_1$, which process comprises (a) fluidizing the solid powder in a stream of a carrier gas to form a fluidized bed of the solid powder in the carrier gas, (b) liquifying the coating material by heating it to a temperature greater than $T_2$ and then introducing a predetermined amount of the liquified coating material in the fluidized bed under turbulent mixing conditions so that the liquified coating material forms an aerosol in situ within the carrier gas and thereby encapsulates substantially all of the solid powder with a predetermined amount of the liquified coating material, (c) passing the resultant fluidized bed through a cooling zone to cool the encapsulated powder to a temperature below $T_2$, thereby substantially silidifying the encapsulating coating material, and (d) recovering the resultant encapsulated powder.

2. A process according to claim 1 in which tin is the normally solid coating material.

3. A process according to claim 1 in which zinc is the normally solid coating material.

4. A process according to claim 1 in which aluminum is the normally solid coating material.

5. A process according to claim 1 in which magensium is the normally solid coating material.

6. A process for the production of encapsulated powders, by which a solid metallic powder having a melting point $T_1$ is encapsulated within a coating of a normally solid coating material selected from the group consisting of metallic and non-metallic coating materials having a melting point $T_2$, where $T_2$ is less than $T_1$, which process comprises (a) fluidizing the solid metallic powder in a stream of a carrier gas to form a fluidized bed of the solid metallic powder in the carrier gas, (b) liquifying the coating material by heating it to a temperature greater than $T_2$ and then introducing a predetermined amount of the liquified coating material in the fluidized bed under turbulent mixing conditions so that the liquified coating material forms an aerosol in situ within the carrier gas and thereby encapsulates substantially all of the solid metallic powder with a predetermined amount of the liquified coating material, (c) passing the resultant fluidized bed through a cooling zone to cool the encapsulated powder to a temperature below $T_2$, thereby substantially solidifying the encapsulating coating material, and (d) recovering the resulant encapsulated powder.

7. A process in accordance with claim 6 in which aluminum powder is the solid metallic powder.

8. A process in accordance with claim 6 in which copper powder is the solid metallic powder.

9. A process in accordance with claim 6 in which iron powder is the solid metallic powder.

10. A process in accordance with claim 6 in which nickel powder is the solid metallic powder.

11. A process according to claim 6 in which wax is the normally solid coating material.

References Cited

UNITED STATES PATENTS

| | | | |
|---|---|---|---|
| 1,710,747 | 4/1929 | Smith. | |
| 2,042,635 | 6/1936 | Schellens | 29—192 X |
| 2,294,895 | 9/1942 | Drapeau et al. | 29—192 X |
| 2,422,439 | 6/1942 | Schwarzkopf | 29—192 X |
| 2,706,163 | 6/1953 | Fitco | 117—100 X |
| 2,993,469 | 7/1961 | Tarpley et al. | 117—100 X |
| 3,110,626 | 11/1963 | Larson et al. | 117—100 X |
| 3,247,014 | 4/1966 | Goldberger et al. | 117—100 |

WILLIAM D. MARTIN, *Primary Examiner.*

M. R. P. PERRONE, Jr., *Assistant Examiner.*

U.S. Cl. X.R.

118—303